(12) United States Patent
MacWhinnie et al.

(10) Patent No.: US 7,833,494 B2
(45) Date of Patent: Nov. 16, 2010

(54) METHOD AND APPARATUS FOR THE DESTRUCTION OF VOLATILE ORGANIC COMPOUNDS

(75) Inventors: Raymond D. MacWhinnie, Springfield, MA (US); Garry L. Van Heest, Colchester, CT (US); Brian M. Igoe, Lincoln (GB)

(73) Assignee: Siemens Aktiengesellschaft, Munich (DE)

( * ) Notice: Subject to any disclaimer, the term of this patent is extended or adjusted under 35 U.S.C. 154(b) by 1630 days.

(21) Appl. No.: 10/353,639

(22) Filed: Jan. 29, 2003

(65) Prior Publication Data

US 2004/0147798 A1 Jul. 29, 2004

(51) Int. Cl.
*B01D 50/00* (2006.01)
(52) U.S. Cl. ........................................ 422/168
(58) Field of Classification Search ................ 422/168; 60/39.12
See application file for complete search history.

(56) References Cited

U.S. PATENT DOCUMENTS

| | | | |
|---|---|---|---|
| 2,828,605 A | 4/1958 | Dobson | |
| 5,216,876 A | 6/1993 | Gabrielson et al. | |
| 5,294,410 A | * 3/1994 | White | 422/171 |
| 5,533,890 A | 7/1996 | Holst et al. | |
| 5,692,458 A | 12/1997 | Green | |
| 5,832,713 A | * 11/1998 | Maese et al. | 60/783 |
| 6,042,791 A | 3/2000 | Johnson et al. | |
| 6,226,976 B1 | 5/2001 | Scott et al. | |
| 6,321,462 B1 | 11/2001 | Seidl et al. | |
| 6,655,137 B1 | 12/2003 | Sardari | |

FOREIGN PATENT DOCUMENTS

DE  199 21 981 A1  11/2000
WO  WO 99/57498  11/1999

* cited by examiner

*Primary Examiner*—Tom Duong

(57) ABSTRACT

An apparatus for destruction of volatile organic compounds (VOCs) includes an assembly 10 for collecting VOCs from at least one source of VOCs and an assembly 12 for thermodynamically destroying collected VOCs. The apparatus also includes an assembly for transporting collected VOCs from the assembly 10 for collecting VOCs to the assembly 12 for thermodynamically destroying collected VOCs. Additionally, an assembly 14 for monitoring the assembly for thermodynamically destroying collected VOCs is provided. A device controls the feed of collected VOCs to the assembly 12 for thermodynamically destroying collected VOCs and the operation of the assembly 12 for thermodynamically destroying collected VOCs as a function of one another such that the proportion of the collected VOCs to the primary fuel in the fuel combination is below a predetermined limit which varies with respect to the combustion rate of the assembly 12 for thermodynamically destroying collected VOCs.

5 Claims, 3 Drawing Sheets

METHOD AND APPARATUS FOR THE DESTRUCTION OF VOLATILE ORGANIC COMPOUNDS

BACKGROUND OF THE INVENTION

Various approaches for destroying or eliminating volatile organic compounds (VOCs) have been proposed. U.S. Pat. No. 5,650,128 notes the type of treatment chosen has generally depended on the composition and concentration of the VOCs. For example, in cases where the concentration and/or the boiling point of the VOCs are low, condensation is economically impractical as compared to the capital and operating costs of adsorption or oxidation. But, U.S. Pat. No. 5,650,128 notes that one problem in many VOC abatement situations is that the concentration of VOCs will vary over time. U.S. Pat. No. 5,650,128 further notes that, for high VOC loadings, thermal oxidizers are typically preferred due to their ability to withstand high temperatures, and their low operating cost and high destruction rate. For low VOC loadings, catalytic oxidizers are typically preferred due to their lower operating temperature, which requires very little supplemental fuel addition. Conversely, when a thermal oxidizer is operated on low VOC concentrations, high fuel consumption is required to maintain the high temperatures required by the oxidizer. When a catalytic oxidizer is operated on high VOC concentrations, potential catalyst sintering and deactivation can result due to excessive temperatures.

U.S. Pat. No. 5,650,128 notes that attempts have been made to overcome this operating cost/burnout scenario by creating systems that utilize both a thermal oxidizer and a catalytic oxidizer, but such systems typically have the two oxidizers as separate entities with some sort of mechanism for switching from one unit to another depending upon VOC concentration. One example of such a dual system is shown in U.S. Pat. No. 4,983,364 (Buck et al.) but such dual, segregated systems result in high capital costs.

U.S. Pat. No. 5,427,746 notes that a conventional thermal oxidizer can operate at temperatures in excess of 1,400 degree F. and convert over 99% of the VOCs. However, it is noted, the exhaust can contain nitrogen oxide ($NO_x$) formed in the burner—and carbon monoxide (CO)—a product of incomplete combustion). This is disadvantageous in that environmental regulations are requiring increasingly stringent controls on VOC, CO and $NO_x$ emissions. U.S. Pat. No. 5,427,746 notes, for example, that European regulations are requiring the control of VOC levels below 20 $mg/Nm^3$, and control of CO and $NO_x$ levels below 50 $mg/Nm^3$.

U.S. Pat. No. 5,673,553 discloses a system for the destruction of VOCs comprising a combustor and a reaction chamber operable to destroy VOCs by combustion. However, the need still exists for a VOC approach which can balance the feed of VOCs from one or multiple sources in a manner which ensures safe and reliable feed of the VOCs. Moreover, in the event that a VOC destruction arrangement includes sensing capability to sense properties of the VOCs contributed by the various VOC sources, such a VOC contributor sensing system should preferably be inexpensive to manufacture and should be capable of using a power source that is readily available in a typical process plant, in order to keep installation costs to a minimum. The system should be suitable for use in harsh environments, including areas subject to spray washing, high humidity, high and low temperatures, and vibration. The system also should be simple and reliable, in order to keep maintenance costs to a minimum.

Accordingly, it is an object of the present invention to provide an apparatus and method that addresses the concerns set forth above.

SUMMARY OF THE INVENTION

According to the present invention, a method and an apparatus operable to perform the method of the present invention are provided.

According to one aspect of the present invention, the apparatus comprises an artificially delimited cumulative volatile organic compound (VOC) collection area, a combined VOC destruction and power generating assembly, and a process control assembly.

In accordance with further aspects of the present invention, the apparatus comprises an accumulator adapted to receive VOC emissions from the emissions source, a sensor in flow communication with an outlet of the accumulator for generating a signal indicative of a physical property of the emission, and a sensor interface circuit receiving the signal and generating data relating to the emission from the emissions source. The accumulator may comprise a collecting tube.

In accordance with another aspect of the invention, the apparatus includes a sample exhaust outlet in flow communication with the outlet of the accumulator. The sample exhaust outlet draws the emissions from the accumulator to expose the sensor to the emissions.

In accordance with another aspect of the invention, the apparatus includes a sensor calibrator in flow communication with the at least one sensor for storing a calibrant and exposing at least one sensor to the calibrant.

In accordance with another aspect of the invention, data generated by the sensor interface circuit is derived by measuring the frequency of the signal generated by the sensor.

In accordance with another aspect of the invention, the system includes a microcontroller adapted to receive the data from the sensor interface circuit, and a memory connected to the microcontroller for storing data from the sensor interface circuit where the data is derived from at least one sensor's response to the calibrant.

In accordance with another aspect of the invention, an assembly of the apparatus for controllably feeding VOCs emission from an emissions source comprises a sensor in flow communication with an outlet of the accumulator for generating a signal indicative of a physical property of the emissions, a sensor interface circuit receiving the signal for generating data relating to the emissions from the emission source, and a microcontroller receiving the data for generating control signals for reducing emissions from the emission source.

In accordance with another aspect of the invention, a method for collecting data relating to emissions from an emission source comprises collecting at least a portion of the emissions, exposing at least one sensor to the emissions to generate a signal indicative of a physical property of the emissions, and processing the signal generated by the at least one sensor to generate data relating to the emissions from the emissions source.

In accordance with another aspect of the invention, a method for controllably feeding VOCs emissions from an emission source comprises situating an accumulator adjacent to the emission source to receive the emissions, providing at least one sensor in flow communication with the accumulator, exposing at least one sensor to the emissions to generate a signal indicative of a physical property of the emissions, and processing the signal generated by the at least one sensor to generate control signals for controlling plant conditions to reduce the VOCs emissions from the emissions source.

According to a further additional aspect of the present invention, the VOCs contributor sensing system is preferably inexpensive to manufacture and can advantageously use a power source that is readily available in a typical process plant, in order to keep installation costs to a minimum. The system is suitable for use in harsh environments, including areas subject to spray washing, high humidity, high and low temperatures, and vibration. The system also is simple and reliable, in order to keep maintenance costs to a minimum

BRIEF DESCRIPTION OF THE DRAWINGS

The features and advantages of the present invention will be best appreciated upon reference to the following detailed description and the accompanying drawings, in which.

DETAILED DESCRIPTION OF THE INVENTION

Figure 1:
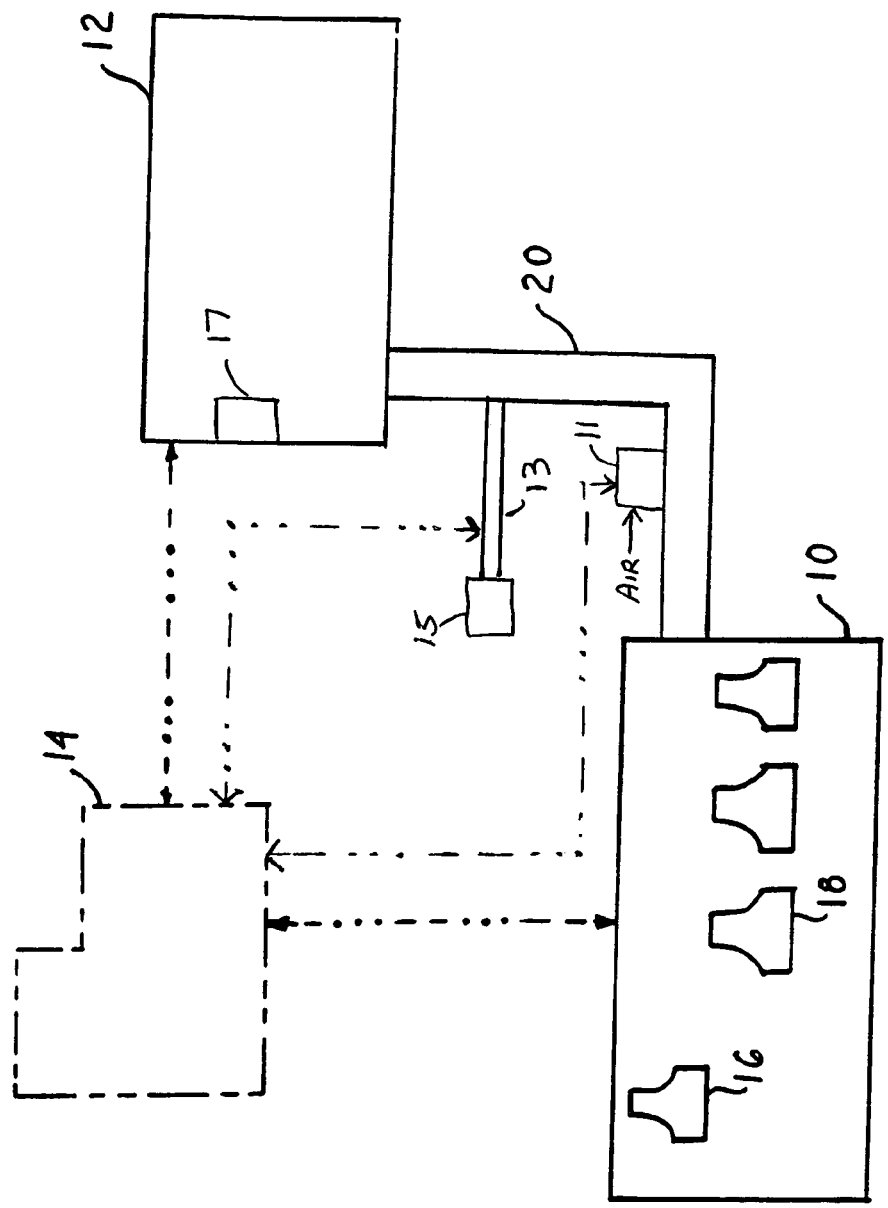
FIG. 1 is a schematic view of an illustrative embodiment of the apparatus of the present invention operable to perform the method of the present invention, the apparatus comprising an artificially delimited cumulative volatile organic compounds (VOC) collection area, a combined VOC destruction and power generating assembly, and a process control assembly.

A detailed description of the method and apparatus of the present invention is now provided with reference initially to FIG. 1, which schematically shows an artificially delimited cumulative volatile organic compounds (VOC) collection area 10, a combined VOC destruction and power generating assembly 12 operable to controllably destroy volatile organic compounds (VOC) fed thereto from the collection area 10, and a process control assembly 14 for controlling the feed of volatile organic compounds (VOC) from the collection area 10 to the combined VOCs destruction and power generating assembly 12. The collection area 10 can comprise a single source of volatile organic compounds (VOCs) such as, for example, a conventional gas collection hood, representatively designated as a hood 16, mounted adjacent an industrial work site at which volatile organic compounds (VOCs) are generated for collecting such volatile organic compounds (VOCs), or the collection area 10 can comprise multiple sources of volatile organic compounds (VOCs) such as, for example, the hood 16 as well as a plurality of additional conventional gas collection hoods 18.

The volatile organic compounds (VOCs) collected by the collection area 10 are transported via a volatile organic compounds duct system 20 from the collection area 10 to the combined VOCs destruction and power generating assembly 12. This volatile organic compounds transport through the duct system 20 is controlled by the process control assembly 14 as will be described in more detail shortly.

Figure 2:
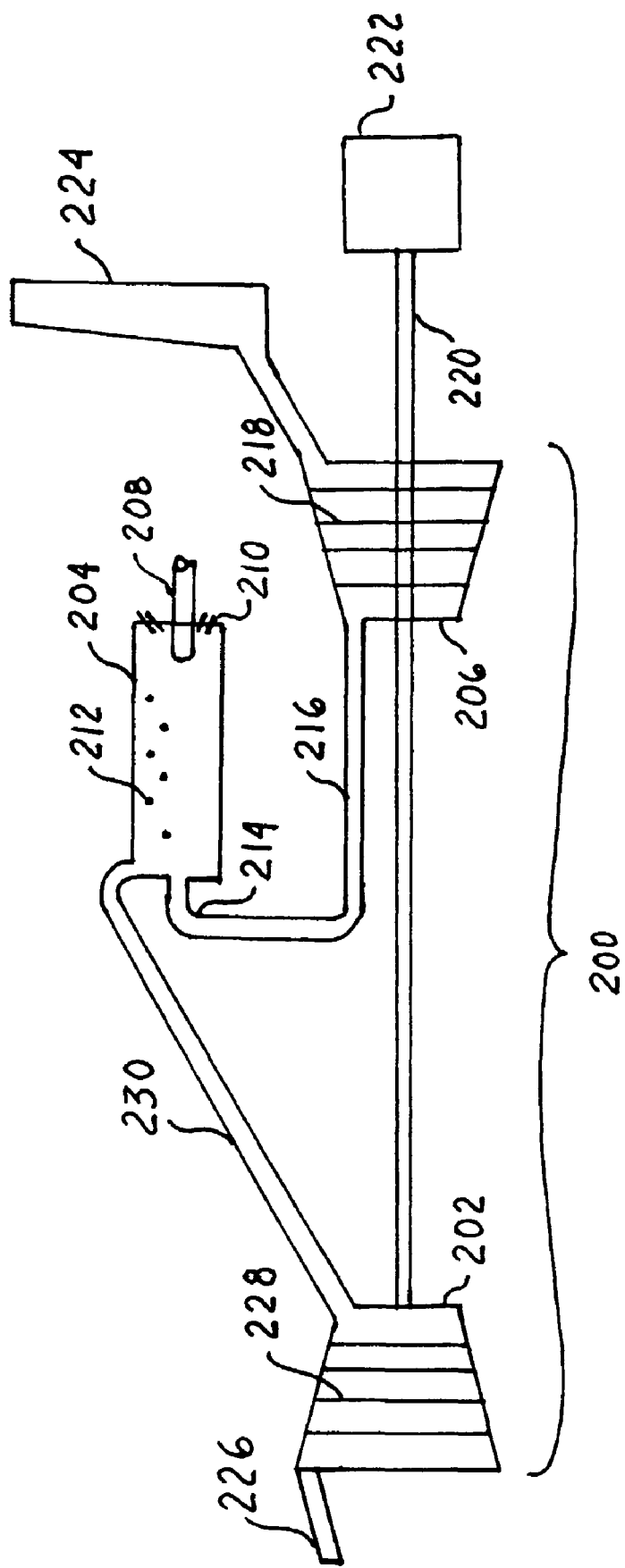
FIG. 2 is a schematic view showing more details of the combined VOC destruction and power generating assembly of the apparatus shown in FIG. 1.

As seen in FIG. 2, the combined VOCs destruction and power generating apparatus 12 is preferably configured in the form of a gas turbine 200 having a compressor 202, a combustor section 204 and an expansion turbine 206. A primary fuel in the form of oil, natural gas or other fuel enters the combustor section 204 through a pipe 208 which may have nozzles and orifices (not shown). The fuel reacts with air which enters the combustor section 204 through registers or vanes 210 surrounding the fuel entry apparatus. As the air and fuel enter the combustor section 204 they mix and burn. Combustion occurs in a flame zone where the temperature is well above 3000 degree F. The combustion products are cooled to around 2000 degree F. by mixing with excess air which enters through the register 210 and by mixing with air which enters through a plurality of cooling holes 212. The combustion products, diluted with excess air exit the combustor section 204 through a combustor outlet 214 and go through duct work 216 to the expansion turbine 206 where they drive turbine blades 218. These blades turn a common shaft 220 which drives the compressor 202 and a generator 222. After the power turbine extracts as much energy as possible from the combustion products, they are exhausted to the atmosphere through a stack 224.

Air is introduced into the compressor 202 by way of an air intake 226. The air is compressed by the blades 228 in the compressor 202 and progresses through duct work 230 to the combustor section 204. Part of the air enters byway of the air register 210, and the remainder by way of the cooling holes 214. In the combustor section 204, the air combines with the fuel and burns. The combustion products proceed with excess air, as described above, ultimately to the stack 224 with passage enroute through the power turbine.

A fuel source for the turbine 200 could be a fuel containing waste air stream from a manufacturing or other process, such as paint booth ventilation air or print drying air, collected in the collection area 10.

In accordance with the present invention, the combined VOC destruction and power generating assembly 12 can concurrently destroy VOCs and realize the fuel value of such VOCs produced from a variety of different environments. In this context, the term "VOCs" is to be understood as including, but not limited to, carbon containing compounds, such as hydrocarbons, alcohols, ketones, aldehydes, ethers, organic acids, and the like. For example, as used herein, the term VOCs may refer to pentane, toluene, ethanol, methanol, ethyl acetate, benzene, polystyrene and the like. Such VOCs or similar chemical compounds are typically produced from the evaporation of chemicals used in and generated by basic industrial processes to produce plastics, pharmaceuticals, bakery products, printed products and the like.

The combined VOCs destruction and power generating assembly 12 can be employed to destroy VOCs which can be collected from the plant as whole, from special isolated or hooded areas, from dryers or from a VOC concentrator utilized in such plants. It should be appreciated that the amount of VOCs present in such air may vary from trace concentrations to larger concentrations, over time and as conditions in the plant change.

Figure 3:
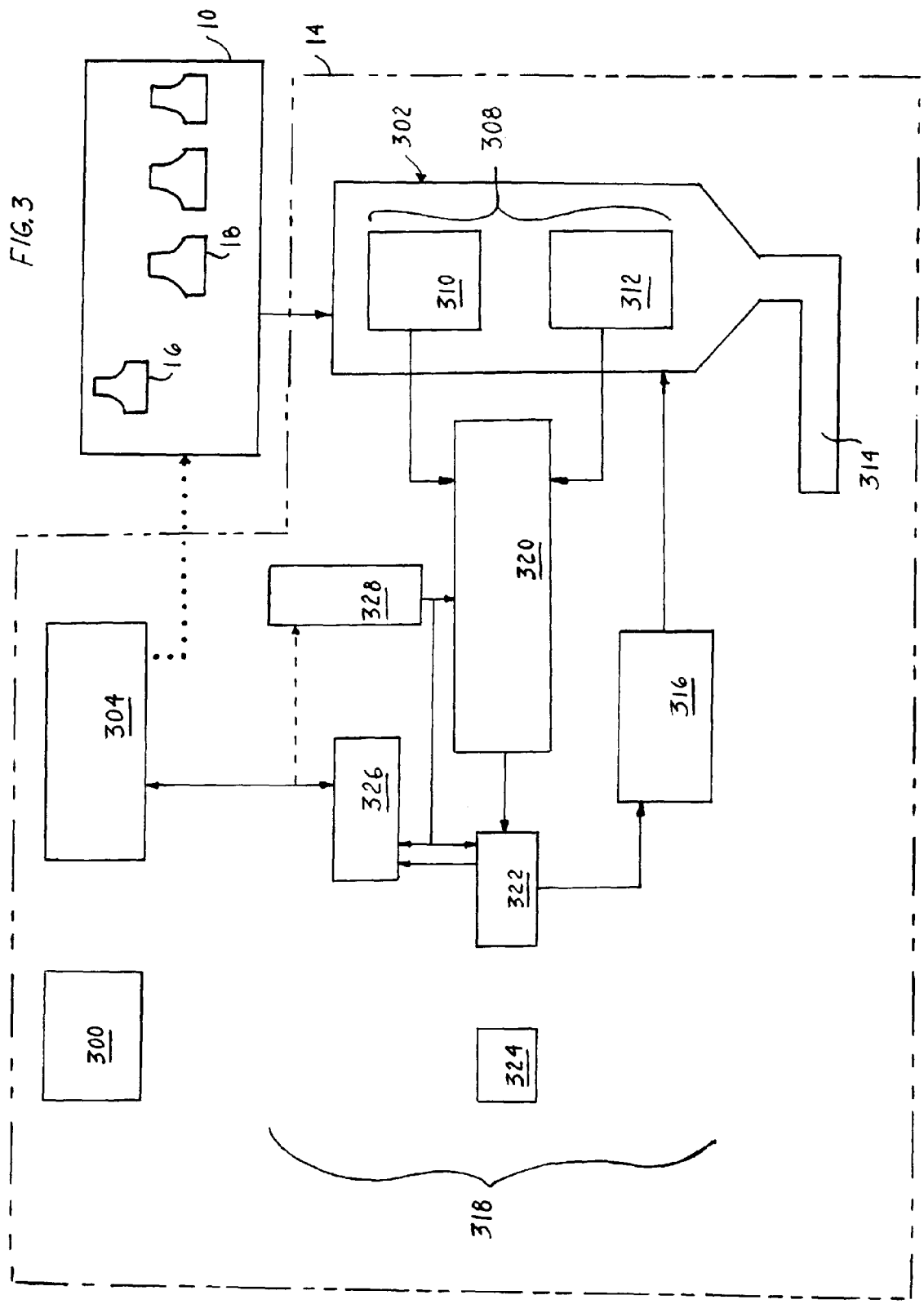
FIG. 3 is a schematic view showing more details of the artificially delimited cumulative volatile organic compound (VOC) collection area and the process control assembly of the apparatus shown in FIG. 1.

Reference is now had to FIG. 3, which schematically illustrates the major components of the process control assembly 14. The process control assembly 14 comprises a system coordinator assembly 300, a VOCs contributor sensing system 302, and a volatile organic compounds (VOCs) transport regulating system 304. A sample stream is drawn from a volatile organic compound (VOC) source such as, for example, the hood 16, into a sample retrieval system 308. The sample retrieval system 308 comprises a sensor chamber within which are disposed a gas sensor array 310 and thermodynamic sensor array 312. The sample stream 306 is drawn into the sensor chamber, exposing the gas sensor array 310 and the thermodynamic sensor array 312 to the sample stream 306. The sample stream 306 then passes into the sample exhaust outlet.

The sample retrieval system 308 is integrated with a remote calibration system 316, which is arranged to inject a small quantity of the gas being measured into the sample stream to enable automated calibration of the gas sensors.

In addition, control and communication system 318 is provided to process the sensor outputs and perform control and communication functions for the VOCs contributor sensing system 302. The control and communication system 318 includes sensor interface circuit 320, microcontroller 322, memory 324, communication interface circuit 326, and power conversion circuit 328.

The gas sensor array 310 and thermodynamic sensor array 312 are connected to sensor interface circuit 320, which processes the signals from the sensor arrays and provides the processed signals to microcontroller 322. The microcontroller 322 stores the data from the sensors in memory 324, and may use the sensor data received from the VOCs contributor sensing system 302 to initiate control actions to reduce or eliminate the emissions. For example, the microcontroller 322 could close a valve upstream from the emission source 304 to stop the flow of vapors or gas through the emission source 304 in order to stop emissions caused by leakage of the vapors or gas. Alternatively, the microcontroller 322 could alter the operating condition of the emission source 304 itself to reduce or eliminate the emissions. Microcontroller 322 may use communication interface circuit 326 to provide these control signals to the upstream valve, the emission source 304, or any other plant equipment that may be used to reduce or eliminate the emissions.

Microcontroller 322 may also use communication interface circuit 326 to provide sensor data to a remote plant process control system 304. The VOCs contributor sensing system 302 may perform measurements of emissions and immediately communicate the resulting sensor data to a separate plant control system 304. Alternatively, the VOCs contributor sensing system 302 may store sensor data from each measurement for later retrieval by the plant control system 304.

The communication interface circuit 326 also may receive data and control commands from the plant control system 304. The plant control system 304 may use the sensor data received from the VOCs contributor sensing system 302 to initiate control actions to reduce or eliminate the emissions. For example, the plant control system 304 could close a valve upstream or alter the operating condition of the emission source 304 as described above to reduce or eliminate the emissions.

The power conversion circuit 328 receives electrical power, which may be transmitted over the communication link with the plant control system 304, and provides power to the control and communication system 318 at a suitable voltage.

The VOC contributor sensing system 302 may be used to detect the presence or measure the concentration of various types of fluids emitted from the hood 16. The system may be used to detect polluting substances emitted from the source, or to detect leakage of non-hazardous substances the loss of which may be a cause of concern. The VOCs contributor sensing system may be used to detect emissions from any kind of source, particularly industrial process equipment from which VOCs may leak. Examples include control valves, block valves, or pumps installed on lines carrying hazardous gases; agitators, screw conveyors, or other equipment installed on process vessels containing hazardous fluids, heat exchangers, reactors, etc.

When emissions are detected by the VOCs contributor sensing system 302, this data may be used by the VOCs contributor sensing system 302 to control the process in such a way as to reduce or completely destroy the emissions via combustion thereof. Alternatively, the data may be transmitted to a remote plant process control system 304 which may respond by controlling the process in like manner.

The sensor chamber is preferably constructed of any suitable material having the requisite durability and inertness properties. The interior of the chamber may be left unfinished, or coated or machined to achieve a smooth finish to reduce surface sorption of gases from the sample stream. The sensor chamber may be constructed of other suitable corrosion resistant materials that are not affected by the emissions being monitored. The sensor chamber is preferably constructed as a modular unit to permit replacement of the unit in the field.

The control and communication system 318 includes circuits to interface to the sensors and to control the remote calibrator 316. A microcontroller 322 communicates with each of these devices and sends data to the communication interface circuit 326 for transfer to a plant control system 304. A power conversion circuit 328 provides power to the control and communication system 318.

The microcontroller 322 controls the operation of the VOCs contributor sensing system 302. The microcontroller 322 manages communications between the components of the VOCs contributor sensing system 302, and communication with the plant control system 304. The microcontroller 322 also provides storage of measurement data from the gas sensor array 310 and thermodynamic sensor array 312, as well as data derived from calibration of the gas sensors, in memory 324.

The microcontroller 322 may be programmed to perform emission measurements upon request from the plant control system 304. The data may be stored in memory 324 temporarily and uploaded to the plant control system 304 after each measurement cycle. Alternatively, the microcontroller 322 may be programmed to perform emission measurements on a set schedule. The measurement data may be stored in non-volatile memory 324 and uploaded only upon request for the data from the plant control system 304.

The method and apparatus of the present invention each advantageously provide a complete system that can sense and destroy, in an integrated manner, volatile organic compounds (VOCs) air emissions from manufacturing processes and concurrently produce valuable thermal and electrical energy for the host facility. The element that sets this system apart from conventional VOCs destruction systems is that energy is consumed in the destruction process but is recovered in a highly efficient manner. The method and apparatus of the present invention can integrate two or more of the following tasks: VOCs collection; monitoring and measuring; mixing and blending; injection and combustion; polishing; and energy generation.

As noted with respect to the foregoing description of the method and apparatus of the present invention, VOCs emissions can be generated from a single source or from multiple sources at any specific site location. Typical emission sources are associated with manufacturing processes that use VOCs as application agents, such as VOCs in glues or resins. These emissions must be collected using control devices that allow their associated combustion air stream velocities to be balanced with the emission velocity associated with the VOC source. In the case of multiple sources of emissions at a particular site, balancing is important to ensure that if one particular source of VOC emissions is not in service, the total air flow for the remaining points does not increase and create too high a capture velocity at the remaining sources. Processes associated with VOC sources are designed with optimal emission air flow rates. Increasing capture velocity will change their design parameters and cause non-steady state process conditions.

Since VOCs contribute to the total energy input to the combustion system, it is vital that the type of VOCs being emitted is established and that the quantity of VOCs is controlled to protect the combustion system. Various control devices are incorporated into either the individual source streams or in the main transfer duct for similar VOC emissions being collected. These control devices establish both the type of VOCs being collected and the quantity of VOCs being transferred to the combustion system. These values are used by the system control algorithm to maintain the level of VOCs being transferred to the combustion system below pre-established lower explosive limits (LEL) for the specific VOCs being collected.

Once the VOCs have been collected and the quantity of VOCs being transferred to the combustion system are monitored, it is important that the VOCs be blended with appropriate concentrations of ambient air to maintain the required mass flow to the combustion device and to keep the VOCs blend below predetermined LELs. Proper mixing is also critical to ensure that the air entering the combustion device is well mixed with the ambient air to eliminate any stratification and incomplete or premature combustion. Control devices 11 are incorporated into the system to allow for the introduction of sufficient ambient air to keep the concentration of VOCs being transferred to the combustion device below predetermined LEL limits. Mixing devices are also incorporated into the transfer ducts to ensure that proper mixing occurs to eliminate any imbalanced mixing of constituents such as, for example, excessive variation in a constituent concentration relatively along the ducts or excessive variation in any desired stratification of constituents, and to ensure the desired flow of the mixed constituents for final measurement of VOCs concentrations prior to entering the combustion system. The control algorithm uses these final measured values to determine if all of the mixed constituents of the flow stream are within pre-established limits and can enter the injection phase of the process system. If the levels are too high, then the control algorithm will divert a portion of the total flow to a diverter duct 13. This by-pass duct will divert a pre-determined amount of flow, as established in the control algorithm, to a back-up control device 15 for subsequent destruction.

VOCs injection into the combustion system, which includes both the compressor section and combustion section of a turbine advantageously ensures proper distribution of mixed constituents into the turbine combustors. The system coordinator assembly 300, which is shown in FIG. 1, controls the compressor section to compress the flow constituents to a level determined by the compressor design. This compressed air is then injected into the combustors of the combustion system. The system coordinator assembly 300 continually monitors this process to maintain the proper rotational speed of the turbine and the proper combustion temperatures. The system coordinator assembly 300 feeds information to the control algorithm and are used as a check of the control parameters established for the mixed VOCs flow stream described above. If either rotational speed of the turbine or measured temperatures in the combustion process need adjustment, these will be made by the control algorithm to maintain the proper rotational speed and temperature within the turbine. Injection control devices incorporated ahead of the compressor section of the turbine are controlled by the system coordinator assembly 300 to ensure a uniform non-stratified flow stream into the compressor section of the combustion turbine.

The exhaust flow from the combustion system is preferably continually monitored to confirm the level of VOCs destruction that has occurred up to the time of the most recent monitoring. If the destruction efficiency meets established limits for VOC destruction, then the waste heat can be sent directly to the thermal energy recovery phase of the system. If the VOC destruction level is still too low and does not meet pre-established limits, the control algorithm will actuate a polishing device 17 which will increase the exhaust gas temperature and dwell time to a level that will achieve the necessary VOCs destruction levels as established by monitoring devices located downstream of the polishing section of this system.

Gas turbines are noted for the electrical energy they produce and in some cases the thermal energy that can be recovered from the turbine exhaust. In the system described above, various control devices and system elements are combined in a unique manner to destroy VOCs and simultaneously produce electrical and thermal energy. The electrical energy that is produced with the system described can be connected to the host facility selectrical system to supply electrical energy to the host facility or for sale to the local utility. Because of the VOC destruction efficiency of the system described above, it is now possible to use the waste heat produced by the system to supply some or all of the thermal requirements for the host facility. This can be for process heat or for additional electrical generation through the use of a waste heat boiler and steam turbine.

Since the invention is susceptible to various modifications and alternative forms, it should be understood that the invention is not intended to be limited to the particular forms disclosed. Rather, the scope of the invention extends to all modifications, equivalents and alternatives falling within the spirit and scope of the invention as defined by the appended claims.

What is claimed is:

1. An apparatus for destruction of volatile organic compounds, comprising:
   a VOC collector that collects volatile organic compounds from at lease one source of VOCs;
   a thermodynamic destroyer that thermodynamically destroys collected VOCs adapted to combust a primary fuel and operating to thermodynamically destroy collected VOCs by at least one of combusting collected VOCs which have been combined with the fuel and thermodynamically destroying collected VOCs which have been maintained separate from the primary fuel;
   a VOC transporter that transports collected VOCs from the VOC collector to the thermodynamic destroyer;
   a controller that controls the feed of collected VOCs upstream of the thermodynamic destroyer to ensure that the level of the collected VOCs fed to the thermodynamic destroyer is below a predetermined limit;
   wherein the VOC transporter includes a device, responsive to the controller, for selectively combining collected VOCs with ambient air to maintain the level of the collected VOC's below the predetermined limit; and
   a polishing device responsive to the controller for controlling exhaust gas temperature and dwell time of the thermodynamic destroyer in response to a monitored VOC destruction level.

2. An apparatus for destruction of volatile organic compounds, comprising:
   a collector that collects volatile organic compounds (VOCs) from a VOC source;
   an axial flow combustion turbine configured to combust a primary fuel and the collected VOCs;

a VOC transport system that transports the collected VOCs from the VOC collector the combustion turbine;

a controller that controls an operating condition of the VOC source so that the collected VOC level fed to the combustion turbine is below predetermined limits, and a monitoring device monitoring an exhaust flow of the combustion turbine to confirm achievement of a predetermined VOC destruction level.

3. The apparatus according to claim 2, wherein the controller controls the flow rate of collected VOCs to maintain a rotational speed and a combustion temperature of the turbine within predetermined limits.

4. The apparatus according to claim 2, further comprising a valve upstream of the VOC source, and wherein the controller controls the operating condition of the VOC source by selectively closing the valve.

5. An apparatus for destruction of volatile organic compounds, comprising:

a collector that collects volatile organic compounds (VOCs) from a VOC source;

an axial flow combustion turbine configured to combust a primary fuel and the collected VOCs;

a VOC transport system that transports the collected VOCs from the VOC collector the combustion turbine; and a controller that controls an operating condition of the VOC source so that the collected VOC level fed to the combustion turbine is below predetermined limits;

further comprising a diverter duct upstream of the combustion turbine, and wherein the controller controls the operating condition of the VOC source by diverting a controlled portion of a total flow produced by the VOC source into the diverter duct so that it does not reach the combustion turbine.

* * * * *